United States Patent [19]

Labenz et al.

[11] Patent Number: 4,792,222
[45] Date of Patent: Dec. 20, 1988

[54] PAD SYSTEM FOR A SPECTACLE FRAME

[75] Inventors: Norbert Labenz, Hemmingen; Heinz Neef, Stuttgart, both of Fed. Rep. of Germany

[73] Assignee: Marwitz & Hauser GmbH, Stuttgart, Fed. Rep. of Germany

[21] Appl. No.: 27,950

[22] Filed: Mar. 19, 1987

[30] Foreign Application Priority Data

Mar. 19, 1986 [DE] Fed. Rep. of Germany ....... 3609130

[51] Int. Cl.4 ............................................... G02C 5/12
[52] U.S. Cl. ..................................... 351/136; 351/138
[58] Field of Search ....................... 351/70, 71, 72, 76, 351/81, 88, 136, 137, 138

[56] References Cited

U.S. PATENT DOCUMENTS

| | | | |
|---|---|---|---|
| 1,938,304 | 12/1933 | Uhlemann | 351/76 |
| 4,235,530 | 11/1980 | Stohrer | 351/136 |
| 4,243,306 | 1/1981 | Bononi | 351/136 |

FOREIGN PATENT DOCUMENTS 2064970  4/1972  Fed. Rep. of Germany ...... 351/138

Primary Examiner—Rodney B. Bovernick
Assistant Examiner—P. M. Dzierzynski
Attorney, Agent, or Firm—Walter Ottesen

[57] ABSTRACT

A pad system for supporting a spectacle frame on the bridge of the nose of the wearer includes a pad arm fastened to the spectacle frame in the area of the root of the nose of the wearer. The pad arm has a generally rectangular cross section at the outer end thereof for fastening the pad which has a rectangular blind hole for receiving the outer end of the pad arm. The blind hole is configured such that the longitudinal axes of the cross sections of the blind hole and the pad conjointly define an acute angle. Additionally, it is advantageous to place the blind hole outside of the center axis of the pad. By pushing the pad onto the pad arm in different positions, a spectacle frame with rigid pad arms can easily be adapted to the anatomical actualities of different facial shapes.

10 Claims, 3 Drawing Sheets

PAD SYSTEM FOR A SPECTACLE FRAME

FIELD OF THE INVENTION

The invention relates to a pad system having a pad arm fixed on a spectacle frame in the region of the root of the nose and a pad provided with a generally rectangular blind hole for attaching the pad to the end portion of the pad arm. The end portion of the pad arm has a cross section which corresponds to the shape of the blind hole.

BACKGROUND OF THE INVENTION

Such pad systems are used to support spectacle frames, preferably spectacle frames of metal whose bridge does not sit on the bridge of the nose in the region of the root of the latter.

British Pat. No. 1,498,973 discloses a pad system in which the small plates or pads which rest on the nose are pivotably attached on the pad arm and thus can automatically conform to the shape of the area of the nose on which they rest. Such pad systems are comparatively expensive and the pads are hard to replace.

Based on the realization that it is entirely sufficient to fit the pads only once to the shape of the area of the nose on which they rest, pad systems in which the pads are fixedly connected with the pad arm are increasingly used. For fitting, the pad arms are bent until the desired seat of the pads on the root of the nose has been achieved. In such systems, the pads have a blind hole which is provided either in the pad itself or in a part laterally fastened on the pad, into which the end area of the pad arm is inserted under stress. Such a connection is entirely sufficient; it has the advantage that the pads can be simply exchanged by pulling them off the pad arm.

To avoid sliding of the pads and with them of the spectacle frame on the nose, German Pat. No. 25 45 683 discloses that the pads can be made of a soft material with physiologically harmless properties, for example of silicone rubber with a Shore-D hardness of from 00 to 30. There are difficulties in connecting such a material with a pad arm via a blind hole provided in the pad since there is the danger of the rigid pad arm penetrating the pad. This difficulty has been overcome as disclosed in German Pat. DE-PS No. 28 19 141 by placing the blind hole in a sleeve of a semi-flexible material, for example of polyamide, and embedding this sleeve in the soft material.

The blind hole is generally of rectangular shape and the end area of the pad arm has a corresponding cross section. The expression "generally of rectangular shape" is to be understood to mean that the cross sections of the blind hole and the pad arm are longer than they are wide. This prevents twisting of the pad attached to the pad arm.

The known pad systems make it possible to make allowance for the anatomical actualities of the facial shapes occurring in people of a particular race However, in different peoples and races such typically different anatomical actualities exist, especially in the area of the sides and root of the nose, that the requirements for the optimal fit of spectacle frames can no longer be satisfied with one and the same pad system. As an example, the shape of an Asiatic face could be mentioned, where the area of the root of the nose is wider and of lesser height than in the shape of the typically European face. Thus far this difficulty has been met by providing differing pad systems for the different typical facial shapes. Of course, this involves additional expense during manufacture, storage and control of deliveries of models of spectacle frames intended for worldwide sales.

SUMMARY OF THE INVENTION

It is therefore an object of the invention to provide a pad system which makes possible the worldwide marketing and sale of spectacle frames equipped therewith without the need for changing the pad system. It is another object of the invention to provide such a pad system which can be adapted to the anatomical actualities of differing facial shapes in a very simple manner.

According to a feature of the invention, the longitudinal axes of the cross sections of the blind hole and the pad conjointly define an acute angle.

The pad itself has a symmetrical cross section, that is, its two surfaces have the same form and both can be used for seating the pad on the sides of the nose.

The pad system of the invention makes it possible to change the nose angle, that is the angle formed by the bearing surface of the pads with the plane defined by the spectacle frame, by means of simply changing the pads while maintaining the angular position of the pad receptor, that is the end of the pad arm. When attaching the pads in a first position, the inclination angle formed by the longitudinal axes of the cross sections of the blind hole and the pad is added to the angle determined by the angular position of the end of the pad arm. On the other hand, when attaching the pads in a second position after rotating the same through 180°, the inclination angle is subtracted. In this way, the pad system can be very simply adjusted to differing nose angles.

The blind hole in the pad can extend parallel to the center axis of the pad. It is especially advantageous to have the blind hole extend inclined to the center axis thereby enabling the pad system to be selectively adjusted to especially wide and flat or especially narrow and high nose roots.

It is of special advantage to dispose the blind hole outside of the center axis of the pad. This provides additional possibilities for taking into account differing anatomical actualities of facial shapes.

It is possible to change the pads from the left to the right pad arm and vice versa without rotation. In this manner, the nose angle remains, while the distance of the pads from the edges of the lens frames and therewith the bearing elevation of the frame are changed.

If the pads are additionally rotated 180° during change to the other pad arm, the nose angle is changed while the bearing elevation of the frame remains unchanged.

Finally, the pads can remain associated with the respective pad arms but can be applied in two positions rotated toward each other through 180°. In this way, the nose angle as well as the bearing elevation of the frame on the sides of the nose are changed.

The foregoing shows that the pad system of the invention can be adapted to very different anatomical actualities of facial shapes without having to make any changes to the frame.

To make possible further variations, the pad can be made symmetrical or asymmetrical with respect to its center axis.

Also, pads can be provided which are different with respect to the inclination and/or the course of the blind hole and whose use makes possible a further fine adaptation or fitting of the pad system.

According to another feature of the invention, the pads of the pad system can consist of a uniform material having a hardness sufficient to assure a correct and secure connection with the pad arm. It is especially advantageous and user-friendly to manufacture the pads from a soft material which is easy on the skin, such as silicone rubber, into which is embedded a sleeve made of a semi-flexible material and provided with the blind hole. Apart from the improved wearing properties, this has the advantage that the soft material conforms to the shape of the nose, that is, the material achieves a complete fine adaptation of the pads.

BRIEF DESCRIPTION OF THE DRAWINGS

The invention will be described below with reference to the drawings wherein:

FIG. 4b is a partial section view taken along the line IVb—IVb of FIG. 4a;

FIG. 5b is a partial section along the line Vb—Vb of FIG. 5a;

DESCRIPTION OF THE PREFERRED EMBODIMENTS OF THE INVENTION

Figure 1:
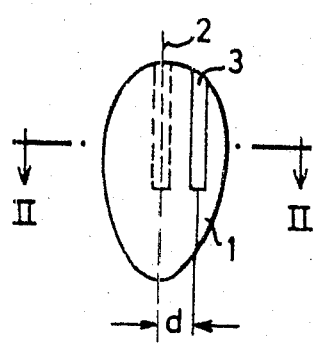
FIG. 1 is an embodiment of a pad in plan view.

FIG. 1 shows a pad 1 having a center axis indicated by reference numeral 2. In conventional pad systems, a blind bore extending along the center axis 2 is provided and is shown by a dashed line in FIG. 1. This hole receives the pad arm therein. The pad 1 of the embodiment shown is provided with a blind hole 3 at a distance d from the center axis 2. As shown in the cross-sectional view through the pad 1 in FIG. 2, the blind hole 3 has a rectangular cross section and is arranged such that its longitudinal axis 21 forms an cute angle a with the cross-sectional axis 20 of the pad 1.

Figure 3:
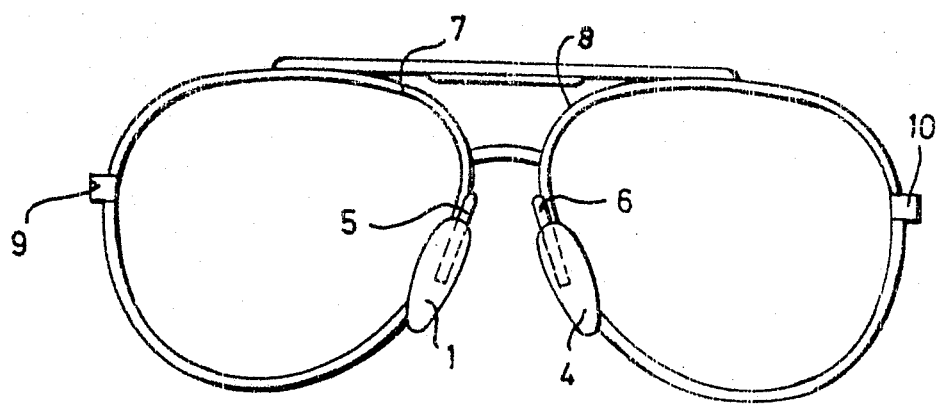
FIG. 3 is an embodiment of a spectacle frame equipped with a pad system according to the invention, seen from the eye side of the wearer of the glasses.
Figure 4A:
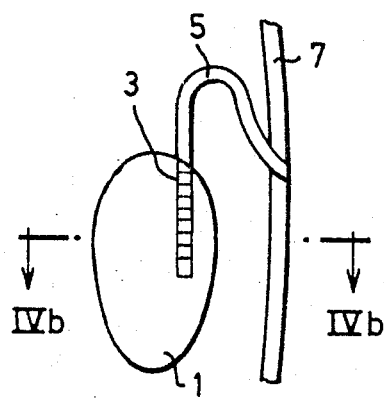
FIG. 4a is a partial side view of the frame of FIG. 3 with a pad mounted thereon.
Figure 5A:
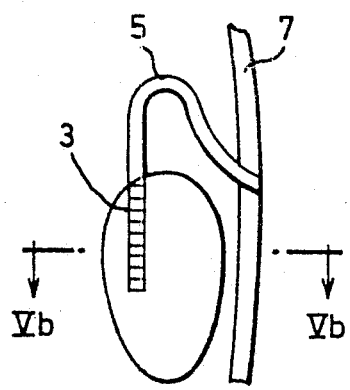
FIG. 5a is a partial view of the frame of FIG. 3 in which the mounted pad has been rotated by 180°.

FIG. 3 shows an embodiment of a spectacle frame with lens frames 7 and 8 for receiving the corrective lenses. The spectacle holders 9 and 10 are pivotally connected to the spectacle frame. Pad arms 5 and 6 are fixedly attached to the lens frames 7 and 8 and their shape is shown in FIGS. 4a and 5a. The free ends of the pad arms 5 and 6 are of rectangular cross section and are firmly surrounded by the respective blind holes of the pads 1 and 4 after the latter are pushed thereon so that no slipping of the pads is possible.

In the embodiment according to FIG. 4a, the pad 1 has been pushed onto the free end of the pad arm 5 such that its larger surface area, seen from the direction of the blind hole 3, faces away from the lens frame 7.

Figure 2:
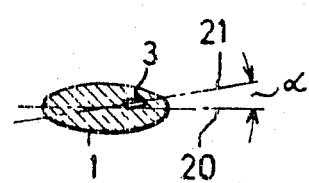
FIG. 2 is a section taken along the line II—II of FIG. 1.
Figure 4B:
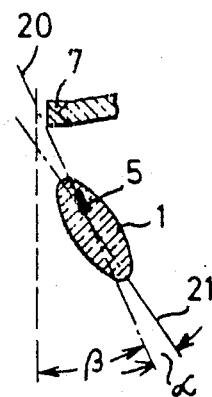

The section of FIG. 4b shows that in the illustrated embodiment, the inclination $\alpha$ of the blind hole 3 shown in FIG. 2 is added to the angle $\beta$ determined by the pad arm 5 resulting in a nose angle $\alpha+\beta$. The distance between the pad 1 and the lens frame 7 of the spectacle frame is relatively large. Accordingly, the bearing height of the frame on the side of the nose is also relatively great.

Figure 5B:
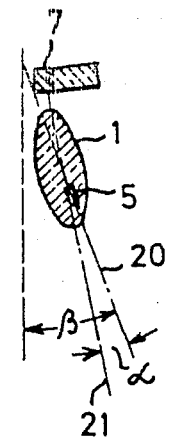

In the view according to FIG. 5a, the pad 1 has been rotated by 180° about its center axis 2 and, in this position, pushed onto the free end of the pad arm 5 also shown in FIG. 4a. The section view of FIG. 5b shows that now the inclination angle $\alpha$ of the blind hole 3 is subtracted from the angle $\beta$ determined by the pad arm 5, thus resulting in a nose angle $\beta-\alpha$. The distance between the pad 1 and the lens frame 7 of the spectacle frame is markedly decreased. Accordingly, the bearing height of the spectacle frame on the side of the nose is also markedly decreased in relation to the position of FIG. 4.

Figure 6:
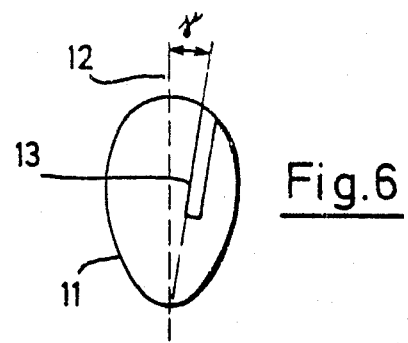
FIG. 6 is another embodiment of a pad in plan view.

FIG. 6 shows an embodiment on a pad 11 with a blind hole 13 inclined at an angle Y to the center axis 12. The angle $\gamma$ can be 10°, for example.

Figure 7:
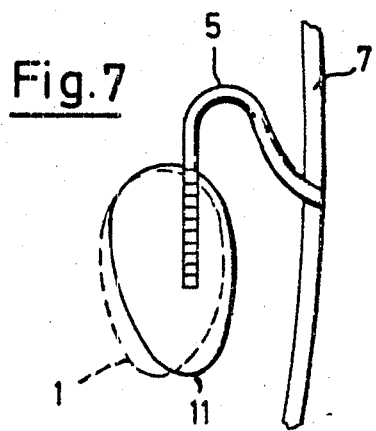
FIG. 7 is a partial side view of the frame of FIG. 3 with the pad according to FIG. 6 mounted thereon.
Figure 8:
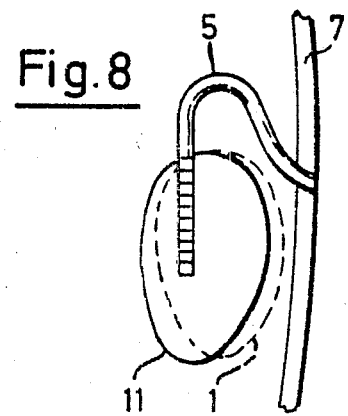
FIG. 8 is a partial view corresponding to FIG. 7 in which the pad has been rotated by 180° and then pushed onto the pad arm.

In FIG. 7, the pad 11 has been pushed onto the end of the pad arm 5 in one position. For comparison, the position of a pad 1 configured according to FIG. 1 has been inserted by dashed lines. If the pad 11 is rotated by 180° around its center axis 12 and then pushed onto the end of the pad arm 5, the result is the position of FIG. 8. In FIG. 8 too, the corresponding position of the pad 1 has been shown for the purpose of comparison.

Figure 9A:
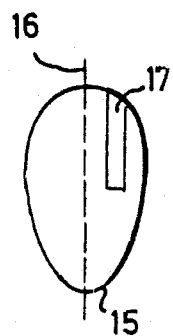
FIGS. 9a and 9b are two views of pads which are symmetrical with respect to their center axes; and, FIG. 10 is a view of a pad made from a soft material.
Figure 9B:
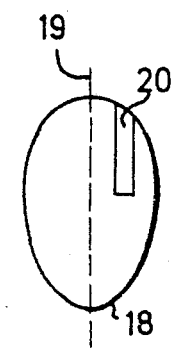

In FIG. 9a, a pad 15 is shown whose exterior shape is symmetrical with respect to the center axis 16. The blind hole 17 is located outside of this center axis. The pad 18 shown in FIG. 9b with the blind hole 20 is also symmetrical in its exterior shape with respect to the center axis 19.

Figure 10:
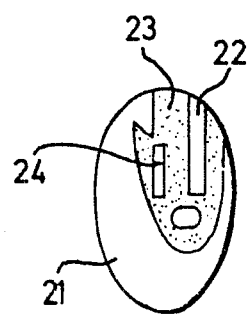

The pad 21 shown in FIG. 10 is made of a clear soft material, for example of silicone rubber. The blind hole 22 is disposed in a sleeve 23 embedded in the pad 21, for example, integrally cast in the pad. The recesses 24 in the sleeve 23 serve to fasten the sleeve 23 in the pad 21. The soft pad of FIG. 10 is also provided with an inclined blind hole in accordance with FIG. 2. The blind hole 22 can also have the inclined course in accordance with FIG. 6. The soft pad 21 itself can have a symmetrical or an asymmetrical exterior shape with respect to its center axis.

As shown especially in FIGS. 4a, 5a, 7 and 8, the pad arm 5 of the pad system according to the invention is at a somewhat greater distance from the lens frame 7 of the spectacle frame than the corresponding distance in pad systems according to the state of the art. This somewhat greater distance is necessary to enable a rotated mounting of the pads 1 according to FIGS. 4a and 5a.

A spectacle frame of FIG. 3 can be used in connection with pads according to FIG. 1 or FIG. 6, depending on the anatomical actualities of the facial shape of the wearer of the spectacles. The outer shape of the pads can be selected to be asymmetrical or can be symmetrical as shown in FIG. 9.

It is understood that the foregoing description is that of the preferred embodiments of the invention and that various changes and modifications may be made thereto without departing from the spirit and scope of the invention as defined in the appended claims.

What is claimed is:

1. A pad system for a spectacle frame comprising:
 a pad arm attached to the spectacle frame in the region of the root of the nose of the wearer;
 a pad having a longitudinal pad axis and having a pad cross section transverse to said axis, said pad cross section having a cross-sectional longitudinal pad axis, said pad having a blind hole formed therein so as to be offset from said longitudinal pad axis;
 said hole having a hole cross section of non-circular configuration and having a cross-sectional longitudinal hole axis corresponding to said hole cross section;
 said cross-sectional longitudinal pad axis and said cross-sectional longitudinal hole axis conjointly defining an acute angle $\alpha$; and,
 said pad arm having an end portion with a non-circular arm cross section corresponding to the non-circular hole cross section so as to permit said pad to be pushed onto said pad arm for engaging the same therewith while preventing a rotation of said pad relative to said pad arm.

2. The pad system of claim 1, said predetermined hole cross section being substantially rectangular and said arm cross section likewise being rectangular in correspondence to said hole cross section.

3. The pad system of claim 2, said pad cross section being symmetrical.

4. The pad system of claim 2, said blind hole extending in a direction parallel to said longitudinal axis.

5. The pad system of claim 2, said blind hole extending in a direction inclined with respect to said longitudinal axis.

6. The pad system of claim 2, said pad being symmetrical with respect to said longitudinal axis.

7. The pad system of claim 2, said pad being asymmetrical with respect to said longitudinal axis.

8. The pad system of claim 2, said pad being made of a soft material having physiologically harmless characteristics; and, said pad system further comprising a sleeve embedded in said pad and defining said blind hole, said sleeve being made of semi-flexible material.

9. A spectacle frame comprising:
 two lens holders;
 bridge means interconnecting said lens holders;
 a pad system for seating the spectacle frame on the nose of a wearer thereof;
 said pad system including: two pad arms connected to corresponding ones of said lens holders in the region for the root of the nose of the wearer; and, two pads corresponding to respective ones of said pad arms;
 each of said pads having a longitudinal pad axis and having a pad cross section transverse to said axis, said and cross section having a cross-sectional longitudinal pad axis, the pad having a blind hole formed therein so as to be offset from said longitudinal pad axis;
 said hole having a hole cross section of non-circular configuration and having a cross-sectional longitudinal hole axis corresponding to said hole cross section;
 said cross-sectional longitudinal pad axis and said cross-sectional longitudinal hole axis conjointly defining an acute angle $\alpha$; and,
 each of said pad arms having an end portion with a non-circular arm cross section corresponding to the non-circular hole cross section so as to permit said pad to be pushed onto said pad arm for engaging the same therewith while preventing a rotation of said pad relative to said pad arm.

10. The pad system of claim 9, said predetermined hole cross section being substantially rectangular and said arm cross section likewise being rectangular in correspondence to said hole cross section.

* * * * *

UNITED STATES PATENT AND TRADEMARK OFFICE
CERTIFICATE OF CORRECTION

PATENT NO. : 4,792,222

DATED : December 20, 1988

INVENTOR(S) : Norbert Labenz, Heinz Neef and Jürgen Rößner

It is certified that error appears in the above-identified patent and that said Letters Patent is hereby corrected as shown below:

On the cover page, Item [75], "Inventors:" add -- Jürgen Rößner, Stuttgart --.

On the cover page, Item [75], "Inventors:" delete "both" and substitute -- all -- therefor.

In column 1, line 41: delete "00" and substitute -- 10 -- therefor.

In column 3, line 55: delete "cute" and substitute -- acute -- therefor.

In column 3, line 55: delete "a" and substitute -- α -- therefor.

UNITED STATES PATENT AND TRADEMARK OFFICE
CERTIFICATE OF CORRECTION

PATENT NO. : 4,792,222

DATED : December 20, 1988

INVENTOR(S) : Norbert Labenz, Heinz Neef and Jürgen Rößner

It is certified that error appears in the above-identified patent and that said Letters Patent is hereby corrected as shown below:

In column 4, line 24: delete "Y" and substitute -- γ -- therefor.

In column 6, line 13: delete "for" and substitute -- of -- therefor.

In column 6, line 18: delete "and" and substitute -- pad -- therefor.

Signed and Sealed this

Thirteenth Day of June, 1989

Attest:

DONALD J. QUIGG

Attesting Officer

Commissioner of Patents and Trademarks